Figure 1:
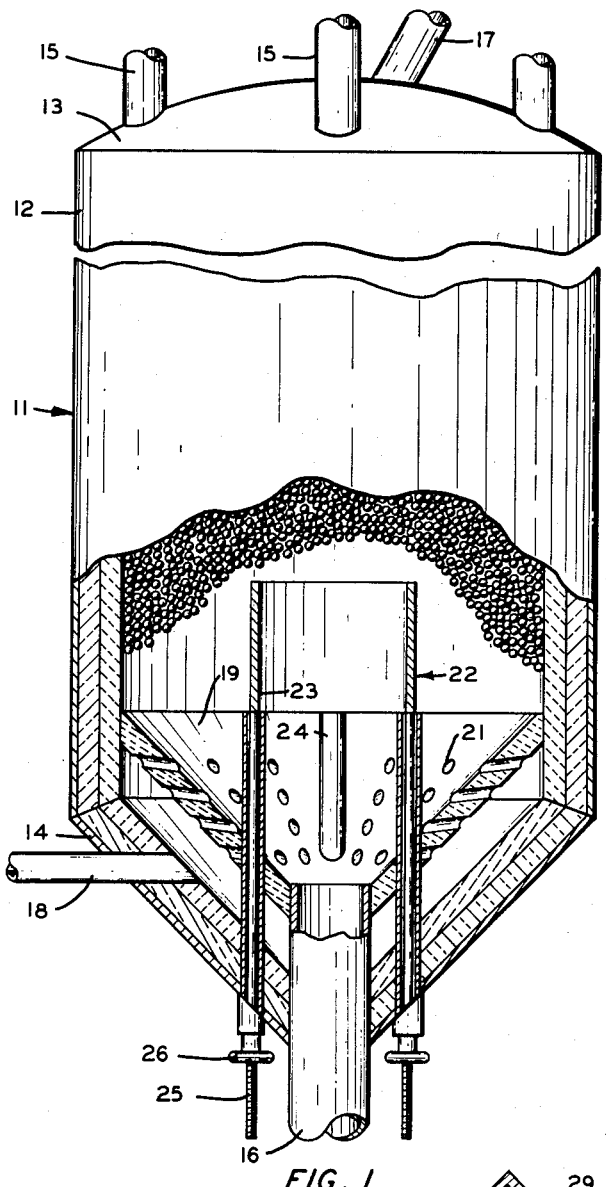

July 24, 1956

L. C. BEARER 2,756,130

PEBBLE HEAT EXCHANGE CHAMBER

Filed Dec. 10, 1951

INVENTOR.
L.C. BEARER

BY Hudson and Young

ATTORNEYS

United States Patent Office

2,756,130
Patented July 24, 1956

2,756,130

PEBBLE HEAT EXCHANGE CHAMBER

Louis C. Bearer, Bartlesville, Okla., assignor to Phillips Petroleum Company, a corporation of Delaware Application December 10, 1951, Serial No. 260,828

9 Claims. (Cl. 23—284)

This invention relates to pebble heater apparatus. In one of its more specific aspects, it relates to improved pebble heat exchange chambers of pebble heater apparatus. In another of its more specific aspects, it relates to a method of regulating pebble flow through pebble heater apparatus. In another of its more specific aspects, it relates to a method of obtaining more nearly equal pebble-gas contact time through pebble heater and reaction chambers.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about one inch in diameter. In a high temperature process, pebbles having a diameter of between ¼ inch to ⅜ inch are preferred. The pebbles must be formed of refractory material which will withstand the temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1600° F. to 3000° F. are desirable.

One disadvantage of conventional pebble chambers in which a relatively shallow pebble bed is maintained and which has a single pebble outlet in its lower end is that it is most difficult to establish uniform contacting of gas and pebbles. In a chamber in which the withdrawal of pebbles is made from a substantially central point in the bottom of the pebble chamber, the center of the pebble bed tends to drop out at all levels in the pebble bed below a level or height in the neighborhood of less than 1½ times the diameter of a cylinder served by the single pebble outlet. Another disadvantage of the conventional pebble heater apparatus is that gas which is injected into the pebble chamber is not uniformly subjected to equal time and temperature conditions through the entire length of the pebble bed.

Each feed to a reactor chamber of a pebble heater apparatus has different characteristics. In particular, these characteristics cause different temperature gradients across the surface of the pebble bed within the reactor. This is the case regardless of whether multiple inlets or a single pebble inlet are provided in the reactor. Thus, a reactor which is designed to crack normal butane (with a heat of reaction of about 850 B. t. u./pound) will have a smaller temperature gradient across the top of the bed than the same reactor will have when it is converted to crack ethane (with a heat of reaction of about 2100 B. t. u./pound).

The same reactor will thus necessarily have to be modified somewhat in order to obtain the most efficient cracking of both feeds. It should also be noted that any reactor which is designed and placed in operation for the first time will also require some adjustment to bring about the most efficient operation thereof. My invention makes possible the modification of such pebble heat exchange chambers in a rapid and feasible manner.

By at least one aspect of this invention, at least one of the following objects of the invention is attained. An object of this invention is to provide improved means for thermally treating or reacting gaseous materials. Another object of the invention is to provide improved means for controlling the pebble flow through pebble heater apparatus. Another object of the invention is to provide means for controlling the flow of pebbles through a pebble heat exchange chamber so as to obtain a lower temperature gradient across the top of the pebble bed within that chamber. Another object of the invention is to provide a method for obtaining more uniform cracking of hydrocarbon materials in a pebble reactor chamber. Other and further objects of the invention will be apparent upon study of the accompanying disclosure.

Figure 2:
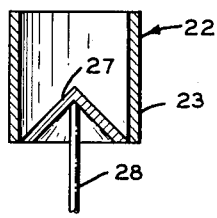
Figure 3:
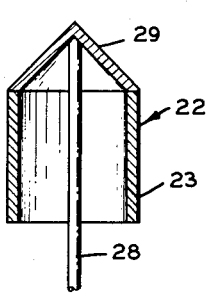
Figure 4:
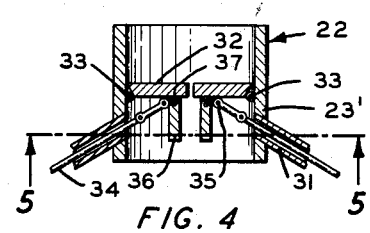
Figure 5:
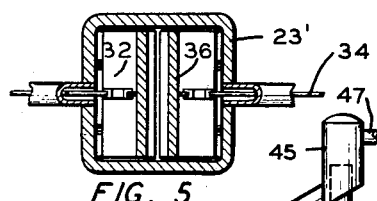
Figure 6:
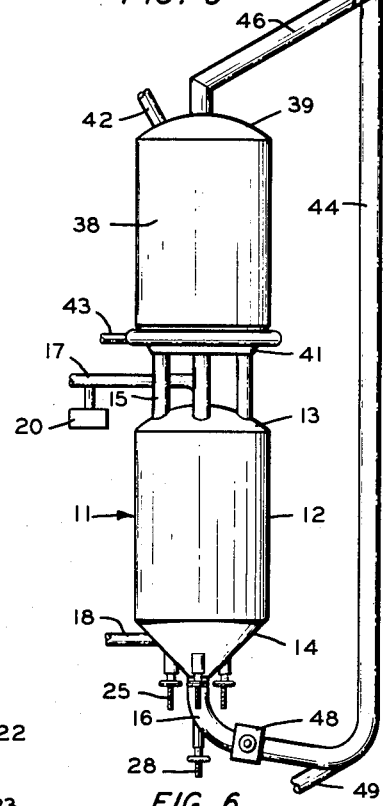

Broadly speaking, this invention resides in the improvement in pebble heat exchange chambers which comprises a baffle in the lower portion of such pebble chamber spaced above the pebble outlet conduit and adapted so as to provide an opening of variable size therethrough or to be spaced variably above the pebble outlet conduit. Better understanding of this invention will be apparent upon study of the diagrammatic drawings in which Figure 1 is a vertical section of a pebble chamber embodying the invention. Figure 2 is a sectional view of a modification of a baffle arrangement of this invention. Figure 3 is another sectional view of an arrangement showing a modification of the baffle of this invention. Figure 4 is another sectional view of an arrangement showing another modification of the baffle structure of this invention. Figure 5 is a plan view of the baffle arrangement of Figure 4. Figure 6 is a schematic view of a pebble heater apparatus.

Referring particularly to the device shown in Figure 1 of the drawings, pebble heat exchange chamber 11 comprises upright, elongated shell 12 closed at its upper and lower ends by closure members 13 and 14 respectively. Pebble inlet conduits 15 are provided in the upper end portion of shell 12, preferably in closure member 13 and the pebble outlet conduit 16 is provided in the lower end of closure member 14. Gaseous effluent outlet conduit 17 is provided in the upper end portion of shell 12, preferably in closure member 13, and gaseous material inlet conduit 18 extends into the lower portion of shell 12, preferably communicating with the interior of chamber 11 through closure member 14. Although inlet conduit 18 is diagrammatically shown as a single conduit, it may be in the form of a header member extending at least a part of the distance around the closure member 14 and communicating with the interior of chamber 11 through that closure member. Several inlet conduits 15 may be positioned and spaced peripherally around the top chamber 11, as shown, or they may be combined as a single inlet conduit which can be actually positioned in the top of such a chamber.

Perforate floor 19 is provided in the lower portion of chamber 11, that closure being spaced above closure member 14 sufficiently to provide a gas distribution chamber between closure member 14 and closure member 19. Perforations 21 in closure member 19 are of such size as to permit the flow of gaseous material from the gas distribution chamber and into the chamber above closure member 19 but to prevent the flow of solid materials therethrough. Pebble baffle arrangement 22 comprises a ring-like or tubular pebble baffle 23, supported in the lower portion of chamber 11 by means of baffle supports 24. Supports 24 are preferably hollow and extend between perforate closure 19 or closure 14 and a level within the lower portion of chamber 11 which is the minimum elevation to which baffle 23 is permitted to be lowered. Elevation members 25 preferably extend through closure members 14 and 19 through baffle support member 24 and are connected to ring-like baffle member 23. Elevation members 25 are slidably supported within baffle support members 24 and are provided with elevating means such as adjusting wheels 26 rotatably fixed in position and threadedly cooperating with elevation members 25. Various means for varying the position of annular baffle 23 may be utilized and the specific means shown in Figure 1 should not be deemed as unduly limiting the invention. Another type of adjusting means which may be utilized includes a linking arrangement whereby a link extending laterally from one of the support members is supported intermediate its ends on a fulcrum and a pressurizing means such as a screw-type device is connected to the end of that link opposite that which is connected to the elevating members 25.

Baffle assembly 22 can be modified in many respects. One such modification is shown in Figure 2 wherein the annular baffle 23 may be movably positioned in the lower portion of chamber 11 and a conical baffle 27 provided so as to seat against the lower end portion of baffle 23. Baffle member 27 may be either rigidly supported in place by support member 28 or may be movably supported by the same support member so as to be raised or lowered with respect to baffle 23 and perforate closure member 19. Figure 3 discloses another modification of the baffle assembly 22 which is similar to that shown in Figure 2 except that the conical baffle identified as 29 is movable above annular baffle 23 by means of support 28 so as to provide a sufficient opening between baffle 23 and baffle 29 to permit pebbles to flow therebetween.

In another modification of baffle assembly 22, as shown in Figure 4, baffle 23' is rigidly fixed in place and supported by baffle support members 31 which extend upwardly and inwardly from perforate closure member 19 or from closure member 14 to the baffle 23'. Baffle 23' is preferably square in shape and is provided with two door type baffle members 32 which are hinged to opposite sides of baffle member 23' at points 33. These door type baffles are supported by adjusting members 34 which extend through baffle support members 31 and are connected to the lower side of door baffle member 32 at points 35. The elevating members 34 can be retained or positioned in a manner similar to that discussed in connection with elevating members 25 and 28. Drop-leaf members 36 are provided at the inner edges of door baffle members 32 and are hingedly connected thereto at points 37. These dropleaf members prevent the pebbles from falling beneath the door baffle member 32 so as to flow into baffle support members 31 and jam elevating members 34.

The diameter of the baffle is generally between 1/6 and 2/3 the diameter of the chamber in which it is placed. The height to which the baffle members may be elevated from the bottom of chamber 11 is between the bottom and nearly to the top of the pebble bed, preferably from 1/8 to 1½ times the diameter of the chamber. Movement of baffle member 23 is particularly important where the pebble inlet to chamber 11 is through the multiple inlet 15, preferably arranged in the upper portion of the chamber. The slope of perforate closure member 19 is equal to or greater than the operating angle of repose of the pebbles at the top of the chamber. The slope of the perforate closure member 19 with respect to the horizontal is preferably greater than that of the angle repose of pebbles, generally within the range of between 30 to 65 degrees.

Referring particularly to Figure 6 of the drawings, the pebble heater apparatus comprises a closed, upright, elongated pebble heater shell 38, closed at its upper and lower ends by closure members 39 and 41, respectively. Gaseous effluent conduit 42 extends from the upper portion of the chamber and heating material inlet means 43 is connected to the lower portion of that chamber. Reactor chamber 11 is positioned below chamber 38 and pebble conduits 15 extend between closure member 41 and closure member 13 of chamber 11. Gaseous effluent conduit 17 is positioned in the upper end portion of chamber 11. Gaseous material inlet conduit 18 is provided in the lower portion of chamber 11. Analyzer 20 is connected to conduit 17. Pebble outlet conduit 16 extends downwardly from closure member 14 of chamber 11 and is connected to the lower end portion of elevator 44. Elevator 44 may be either a mechanical type elevator such as a bucket or screw conveyor type or may be a gas lift type, such as exemplified in Figure 6. In the design shown in the drawings, separator chamber 45 is provided at the upper end portion of elevator 44 and pebble conduit 46 extends downwardly from the lower end portion of separator chamber 45 to the upper end portion of pebble chamber 38. Gaseous effluent conduit 47 is provided in the upper end portion of separator chamber 45. Pebble feeder 48 is provided intermediate the ends of pebble conduit 16 and may be any one of the conventional pebble feeders utilized, such as a star valve, a gate valve, a rotatable table feeder, or the like. Lift gas inlet conduit 49 is provided downstream of feeder 48.

In the operation of the pebble heater apparatus of Figure 6, pebbles are heated in chamber 38 by contact with hot gaseous heat exchange material, the heating of which may result from the combustion of fuel outside of that chamber or in the lower portion of the chamber in a combustion zone separated from the pebble mass or by burning a fuel in direct contact with the pebble mass in chamber 38. Pebbles are introduced into that chamber through conduit 46 and form a contiguous gravitating mass therein which extends downwardly through pebble conduits 15, chamber 11, and conduit 16 to pebble feeder 48. The pebbles are heated in chamber 38 to a temperature generally in the range of 1400° F. to 3200° F. The hot pebbles are then gravitated from chamber 38 through conduits 15 into the upper portion of chamber 11. Generally, pebble inlet temperatures in chamber 11 are about 100° F. to 200° F. below the highest temperature of the pebbles within the first chamber. In the process for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1600° F. to 3000° F. are generally desirable.

Baffle assembly 22 is varied with respect to the distance it is positioned above perforate closure member 19 and as to the opening provided through the ring-like baffle 23 and 23' so as to slow the flow of hotter pebbles through the reactor chamber and to speed the flow of cooler pebbles through that chamber. In this manner, pebbles which would normally be cooler are removed at the center of the chamber and are flowing at such a rate as to reduce the time during which the gaseous reactant materials contact the hot pebbles. By decreasing this time and speeding up the flow of pebbles toward the center of the chamber the temperature of the pebbles with which the reactant materials are contacted is maintained more uniform than would be possible if a fixed baffle were provided in that chamber. The specific operation of the baffle will depend upon whether or not a single central pebble inlet is utilized or whether a plurality of peripherally positioned inlet conduits are utilized. The baffle is positioned in accordance with an analysis of the product gas in analyzer 20.

The rate of flow of pebbles through the pebble chambers is controlled by the operation of pebble flow controller 48. As the pebbles are fed from the downstream end of that flow controller, they are entrained in a stream of lift gas introduced through conduit 49 and are elevated to the separator chamber 45. In this chamber, pebbles are allowed to settle out of the gas stream and gravitate downwardly through conduit 46 into the upper portion of chamber 38. The lift gas is removed from separator chamber 45 through effluent outlet 47.

Support members 24, 25, 31, and 34 will necessarily have to be connected to pebble outlet conduit 16, or closure member 14, depending upon the specific modification of the invention, and the fastening will be such as to prevent the escape of hot gaseous material thereabout. Any of the conventional means of packing the passage through which one or all of these support members slidably pass can be utilized.

Various modifications of this invention will be apparent to those skilled in the art upon study of the accompanying disclosure. Such modifications are believed to be within the sphere and scope of this invention.

I claim:
1. An improved pebble heat exchange chamber comprising in combination a closed, upright, elongated shell; pebble inlet means in the upper end of said shell; gaseous effluent conduit means in the upper portion of said shell; a pebble outlet in the lower end of said shell; fluid inlet means in the lower portion of said shell; a tubular pebble baffle coaxially positioned and longitudinally positionable in the lower portion of the chamber formed within said shell and spaced above said pebble outlet; support means extending from the lower portion of said shell upwardly to said baffle in its lowermost position; an adjustable closure transversely positioned with respect to, aligned with, and disposed in close proximity to said tubular baffle; at least one first elevating member extensibly retained in the lower portion of said shell, extending upwardly to said adjustable closure and connected thereto; and actuating means operatively connected to said first elevating member.

2. An improved pebble heat exchange chamber comprising in combination a closed, upright, elongated shell; pebble inlet means in the upper end of said shell; gaseous effluent conduit means in the upper portion of said shell; a perforate floor spaced from the bottom closure of said shell and forming a gas distribution chamber therebetween; a central pebble outlet extending downwardly from the chamber formed within said shell to the exterior thereof; a tubular pebble baffle coaxially positioned and longitudinally positionable in the lower portion of the chamber formed within said shell; a plurality of support members extending from the lower portion of said shell upwardly to said baffle in its lowermost portion; an adjustable closure transversely positioned with respect to, aligned with, and disposed in close proximity to said tubular baffle; at least one first elevating member extensibly retained in the lower portion of said shell, extending upwardly to said adjustable closure and connected thereto; and actuating means operatively connected to said first elevating member.

3. The pebble heat exchange chamber of claim 2 wherein a plurality of second elevating members are extensibly retained in the lower portion of said shell, extend upwardly to said tubular baffle and are connected thereto; and actuating means operatively connected to said second elevating members.

4. The pebble heat exchange chamber of claim 3 wherein said elevating members connected to said tubular baffle extend slidably through said plurality of support members.

5. The improved pebble heat exchange chamber of claim 2 wherein said tubular pebble baffle is an annular baffle and a conical baffle is axially and transversely disposed with respect thereto and adapted so as to be adjustably spaced downwardly from the lower end of said annular baffle.

6. The improved pebble heat exchange chamber of claim 2 wherein said tubular baffle is an annular baffle and a conical baffle is axially and transversely disposed with respect thereto and adapted so as to be adjustably spaced upwardly from the upper end of said annular baffle.

7. The improved pebble heat exchange chamber of claim 2 wherein said tubular baffle is provided with parallel sides and said closure adjacent said tubular baffle is in two sections, one closure section being flexibly connected to one side of said tubular baffle and the other closure section being flexibly connected to the opposite side of said tubular baffle and in the same horizontal plane, and at least one of said extensible elevating members being flexibly connected to the lower end of each closure portion.

8. The pebble heat exchange chamber of claim 7 wherein said elevating members flexibly connected to said closure are slidably retained within said support members extending upwardly to said tubular baffle.

9. The pebble heat exchange chamber of claim 8 wherein a drop-leaf member is hingedly connected to the inner end of each said closure section.

References Cited in the file of this patent

UNITED STATES PATENTS

| 2,448,922 | Simpson et al. | Sept. 7, 1948 |
| 2,489,628 | Evans | Nov. 29, 1949 |
| 2,528,553 | Royster | Nov. 7, 1950 |
| 2,534,625 | Robinson | Dec. 19, 1950 |
| 2,541,548 | Robinson | Feb. 13, 1951 |
| 2,554,435 | Weber | May 22, 1951 |
| 2,565,811 | Hall | Aug. 28, 1951 |